(12) United States Patent
Gold et al.

(10) Patent No.: US 7,082,469 B2
(45) Date of Patent: Jul. 25, 2006

(54) METHOD AND SYSTEM FOR ELECTRONIC SONG DEDICATION

(75) Inventors: Elliot M. Gold, Altadena, CA (US); Shirley A. Gold, Altadena, CA (US); James H. Shifflett, III, Altadena, CA (US); David L. Hawthorne, New York, NY (US)

(73) Assignee: Gold Mustache Publishing, Inc., Altadena, CA (US)

( * ) Notice: Subject to any disclaimer, the term of this patent is extended or adjusted under 35 U.S.C. 154(b) by 641 days.

(21) Appl. No.: 09/877,817

(22) Filed: Jun. 7, 2001

(65) Prior Publication Data

US 2002/0032752 A1   Mar. 14, 2002

Related U.S. Application Data

(60) Provisional application No. 60/210,668, filed on Jun. 9, 2000.

(51) Int. Cl.
*G06F 13/00* (2006.01)

(52) U.S. Cl. .......................................... 709/231; 726/9
(58) Field of Classification Search ................ 709/231, 709/217–219, 206; 707/1, 10; 713/200–202; 726/3–5, 9
See application file for complete search history.

(56) References Cited

U.S. PATENT DOCUMENTS

| | | | |
|---|---|---|---|
| 5,577,266 A * | 11/1996 | Takahisa et al. ........... 455/3.06 |
| 5,734,119 A * | 3/1998 | France et al. ................. 84/622 |
| 6,288,319 B1 * | 9/2001 | Catona ......................... 84/609 |
| 6,385,596 B1 * | 5/2002 | Wiser et al. ................... 705/51 |
| 6,389,463 B1 * | 5/2002 | Bolas et al. ................ 709/219 |
| 6,581,103 B1 * | 6/2003 | Dengler ....................... 709/231 |
| 6,678,215 B1 * | 1/2004 | Treyz et al. ................... 368/10 |
| 6,769,028 B1 * | 7/2004 | Sass et al. ................... 709/231 |
| 6,856,990 B1 * | 2/2005 | Barile et al. .................. 707/10 |
| 2002/0054072 A1 * | 5/2002 | Hayes-Roth ................ 345/727 |
| 2002/0147699 A1 * | 10/2002 | Barile et al. .................... 707/1 |

FOREIGN PATENT DOCUMENTS

WO    WO 200118655 A1 *  3/2001

* cited by examiner

*Primary Examiner*—Kenneth R. Coulter
(74) *Attorney, Agent, or Firm*—Christie, Parker & Hale, LLP.

(57) ABSTRACT

A system and method to send dedications of popular songs through a communications medium such as the Internet. A sender contacts a musical jukebox Web site and selects a song to dedicate and enters a recipient's electronic mail (email) address. The sender is given a phone number and Personal Identification Number (PIN). The sender calls the phone number, enters the PIN, and leaves a voice message to introduce the dedication. An email is sent to the recipient's email address containing a Uniform Resource Locator (URL) as a link to a dedication Web page. Retrieval of the dedication Web page causes retrieval of a dedication file containing URLs pointing to the voice dedication and the dedicated song. The URLs are extracted from the dedication file and used to play back the voice dedication and the dedicated song.

26 Claims, 19 Drawing Sheets

ThisIsDedicatedTo.com

Welcome to the Rememories dedication page! ThisIsDedicatedTo.com features the music of the baby boomer generation -- predominantly music from the '40s through the '70s.

Remember when calling your favorite radio station and dedicating a song to someone special?

Well, now you can do the same thing right here, just like you used to do on the radio, with a personalized, private voice message and a song -- sent by email.

To get started, read the instructions on the right, then click on the link below.

<u>Click Here to start your Dedication.</u>

810

Instructions step 1   In the Jukebox, select the song you want to dedicate, then click on the Dedication button for the song.

step 2   Fill out the boxes on the Dedication form.

step 3   Click on the Submit button to send your dedication.

step 4   Dial the toll free number on the screen.

step 5   Enter the ID number on the screen step 6   Leave your voice dedication.

step 7   Hang up.

The recipient of your dedication will receive an email message with a link to the dedication. You will be notified when the email has been sent, and again when your recipient receives the dedication

Jukebox

For best results enter one search term.

This site is ASCAP & BMI licensed.

Artist: _300_

Song: _305_

Year: _310_

Search | Reset Form

_315_

| New Search | Dedications  Memories  Shopping  Contacts

| List All |

Home  Jukebox  _User Feedback click here_

FIG. 4

Dedications

<u>Get instructions</u>

Sender's Email Address [ 500 ]

Recipient's Phone Number [ 511 ]

Recipient's Email Address [ 505 ]

Subject [ 510 ]

Please add me to your e-mail list for company updates and announcements

⦿ yes  ◯ no

[ Submit ]——515

FIG. 6

This Audio Dedication was brought to you by

ThisIsDedicatedTo.com

To play this voice dedication you need the latest RealPlayer. Free Download

Are you having trouble hearing your dedication?
Make sure the volume on your computer and speaker is turned up. If a sound player does not pop up, you probably don't have RealPlayer. Free Download Find more sugestions in our Help Menu.

Send a Dedication
This site is ASCAP & BMI licensed.

FIG. 12

METHOD AND SYSTEM FOR ELECTRONIC SONG DEDICATION

CROSS-REFERENCE TO RELATED APPLICATIONS

This application claims the priority of U.S. Patent Application No. 60/210,668, filed Jun. 9, 2000, the disclosures of which are incorporated herein by reference.

BACKGROUND OF THE INVENTION

This invention relates generally to the field of computer network and telephone-based user applications and specifically to musical entertainment applications.

Popular music is ubiquitous, intentionally emotional, and commonly used to set the mood for important events in a listener's life. These features of popular music give it the power to evoke strong memories in a listener of events and periods experienced by the listener. Popular music is available from many sources. Listeners can buy music in many digital and analog formats such as Compact Disks (CDs), Moving Picture Experts Group 1 Audio Layer-3 (MP3), and cassette tapes, all of which can be played on small portable devices. Popular music is also readily available from commercial and non-commercial broadcasters who broadcast over a variety of media from radio waves to computer networks. Furthermore, popular music is intentionally designed to create strong emotional feelings in a listener. These strong emotional feelings may help the listener to associate a song with an event stored in the listener's long term memory, particularly if the listener experiences the event while listening to the song. The combination of ubiquity and strong emotional feelings evoked by popular music leads many listeners to purposefully include popular music at events such as weddings and parties. The purposeful combination of popular music and events in a listener's life as well as the ubiquitous nature of popular music creates many opportunities for music and memories to become associated with each other in a listener's mind.

The Internet is quickly becoming a communications medium which is as ubiquitous as popular music in modern cultures. Services such as electronic mail (email) for personal communication and Web servers serving content to Web clients for dissemination of information to large numbers of people have led to a large demand for these and other Internet-based services. This large demand for Internet-based services has pushed more and more content providers to adopt the Internet as the medium of choice whether the content provider is providing broadcasting services or data retrieval services. The large number of content providers is a boon for consumers because each individual consumer can generally find a Web site with content suited to the consumer's individual taste. Furthermore, the interactive component of Internet-based applications allows for ever finer divisions of the consumer marketplace through consumer customization of the delivery of such Internet-based content.

The trend of consumer customization of Internet content is readily apparent in the popular music industry and may ultimately undermine the role of large popular radio stations in establishing a unifying cultural presence. Many music content providers allow listeners to create their own personal "radio station" where the listener is the Disk Jockey (DJ) and the listener determines which songs will be played. One example is the service provided by RadioMoi, literally "my radio," through its website at www.radiomoi.com. One result of such services is that instead of listeners with a common cultural background listening to a common popular radio station within a geographic area, listeners are able to listen to a large number of competing music sources over many different broadcast and replay media.

Consequently, this lack of a unifying cultural presence in the form of a popular radio station may also be leading to a reduction in the formerly popular pastime of "dedicating" a song to a close acquaintance through a popular radio station. The act of dedicating a song to an acquaintance typically involved the steps of a sender calling the radio station and telling the DJ or his or her staff the name of a song that the sender wants played, the name of the intended recipient of that song, and a short personal message appropriate for retransmission over a publicly licensed broadcast medium. The DJ would in turn play the song and relay the message from the sender to the recipient during the radio station's transmission. The popularity of song dedications is generally considered to lie with a song's ability to evoke memories and emotions as previously described. Therefore, song dedications can be an effective way to convey and share complex emotions and memories when it might not be possible, or desired, for the sender and recipient to communicate directly.

SUMMARY OF THE INVENTION

The present invention sets forth a system and method for using the Internet or electronic media employing computerized database approaches for tying together songs and personal voice messages to send song dedications. A sender uses the Internet to create a song dedication that can then be sent to a recipient, preferably by email. The sender uses a Web browser to access a dedication provider's Web site which contains a database of songs for use in the dedication. The database is preferably searchable by criteria such as title, artist, and year the song was released. Upon entering the search criteria, the sender receives a list of available songs meeting the criteria. The sender may then select a song from the list and continue the process and complete a dedication. Alternatively, the sender may elect to listen to a song from the list to confirm that it is the song the sender wants. The sender then enters relevant information such as the sender's email address, and an e-mail address or telephone number for the intended recipient of the dedication. Other information such as a subject header for an email message to be sent to the recipient and billing information for the sender may also be entered by the sender for a given transaction. In one embodiment, upon receipt of the appropriate information, the provider assigns a Personal Identification Number (PIN) to the transaction. The PIN is intended to be used by the sender to access a computer telephony system for recording a voice message to be appended to the dedicated song to create the desired dedication. The provider sends a web page to the sender containing the PIN and instructions for recording the voice message. According to this embodiment, the sender calls a telephone number to access the computer telephony system where the sender is prompted to enter the PIN and then record a voice message. In another embodiment, if the sender's computer has the appropriate hardware and software, a voice message can be recorded using the sender's computer. The voice message can then be sent back to the provider by email. The provider can then send another email message to the sender with a hypertext link to a Web page containing links to the voice message, the dedicated song or the entire dedication consisting of both the voice message and the dedicated song for review by the sender. At this point, the sender may optionally be permitted to modify the voice message or the dedicated song selected.

Once a dedication has been created and approved by the sender, it is then sent to the recipient by any one of various methods. As one option, the provider sends an email to the recipient with a hypertext link to a Web page with the dedication. Any one of a number of different streaming media players can be used by the provider and the recipient to permit the recipient to play the dedication. One example of such a streaming media player is a product known as RealPlayer which is provided by RealNetworks, Inc. As another option, the computer telephony system is used to place a telephone call to the recipient to play the dedication. As yet another option, the dedication is provided as a physical recording such as a CD, or as some other form of physical computer file such as an MP3 file which the recipient can keep and replay any number of times.

The dedication service provided by the invention may be used in any one of a number of different ways including various commercial transactions involving the Internet. As one example, senders may use the invention to purchase and send a dedication for a fee. As an alternative, the invention may be linked to an Internet-based retail site or through a catalog or a kiosk where it can be used as an electronic gift announcement to advise a recipient that a gift has been ordered for the recipient. For such a transaction, the buyer of a gift is given a one-time access right to the provider's Web site where he or she can use a dedication to "sign" an electronic gift card announcement. The delivery of the email message to the recipient containing the link to the dedication may also be delayed to coincide with the delivery of the gift. The invention may also be used as part of a purchasing incentive program. In one embodiment, completion of an online purchase allows the purchaser a one-time access to the Web site to send a dedication that is not linked to the delivery of a purchase. In another embodiment, a dedication is provided that is accessible by an access code concealed in the packaging of an item that is purchased at either an Internet-based store, a conventional store, or a catalog store. Opening the packaging reveals the access code which is then used by the recipient to access the dedication through the Web site or a telephone network. Such dedications can either be selected by the purchaser of the item, or can be provided by the seller. In still other embodiments, the invention is be used as part of an advertising-driven commercial transaction where the cost of sending dedications is borne by advertisers for the provider's Web site rather than being borne by the senders. For example, in one embodiment, advertising space is sold on the Web site so that advertisements are visible to both the sender and the recipient of the dedication. For such an embodiment, the advertisements may also be targeted based on the type of song used in the dedication, and any other information obtained by the provider in completing the transaction. In still another embodiment, audio advertising can be included in the song dedication.

In another embodiment of a song dedication system according to the present invention, the intended recipient of the dedication receives a notice, either by e-mail, or in a printed notice delivered by traditional post, telling them of the dedication and instructing them what phone number to call and what steps to take to hear the dedication.

BRIEF DESCRIPTION OF THE DRAWINGS

These and other features, aspects, and advantages of the present invention will become better understood with regard to the following description and accompanying drawings where:

FIG. 3 is a Web page for an exemplary embodiment of the present invention showing user instructions for using the exemplary embodiment;

FIG. 4 is a Web page showing an exemplary song search form useful in an embodiment of the present invention;

FIG. 6 is an exemplary Web form for entering email addresses and phone numbers;

FIG. 12 is an exemplary Web page retrieved when a recipient retrieves a dedication;

DETAILED DESCRIPTION OF THE INVENTION

Figure 1A:
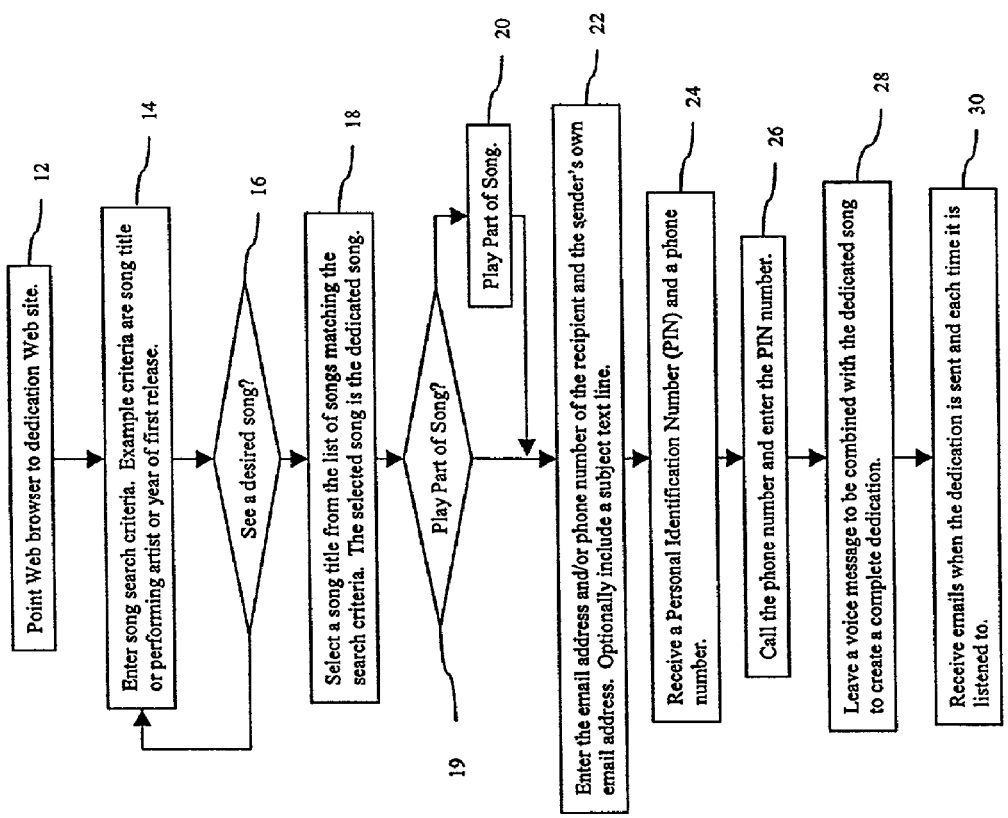
FIG. 1a is a process flow diagram of the steps a sender takes to send a song dedication according to the present invention.

FIG. 1a illustrates the steps a dedication sender takes in making a song dedication through a Web-based dedication provider according to a preferred embodiment of the present invention. The sender, using a personal computer or some other device for accessing the Internet, points a Web browser 12 at an exemplary dedication Web site. There, the Sender enters song search criteria 14 such as a song title, a performing artist's name, or the year a song was first released. In response, the sender receives a list of songs matching the search criteria from the provider. If the sender doesn't see the desired song 16, the sender enters a search criteria again until a desired song is returned in the received list. The sender selects one of the songs from the received list to be the dedicated song 18. Alternatively, the sender may also select 19 to listen to a portion of the dedicated song 20 to ensure the dedicated song is the one the sender wanted. The sender enters transaction information including the email address of the sender and the recipient, an optional recipient phone number, as well as an optional subject line 22. The exemplary dedication Web site gives the sender a Personal Identification Number (PIN) 24. The PIN is a combination of letters, numbers, or other characters given as a unique identifier to the sender. The sender is also given a phone number to use to leave a dedication message 28 in the form of a voice message. The voice message when combined with the dedicated song will create a complete dedication. The sender calls the phone number and enters the PIN. The sender leaves a voice message 28. Alternatively, a text message may be used as a dedication message. The sender receives an email message 30 informing the sender that the dedication has been sent. The sender receives another email message every time the recipient listens to the dedication.

Figure 1B:
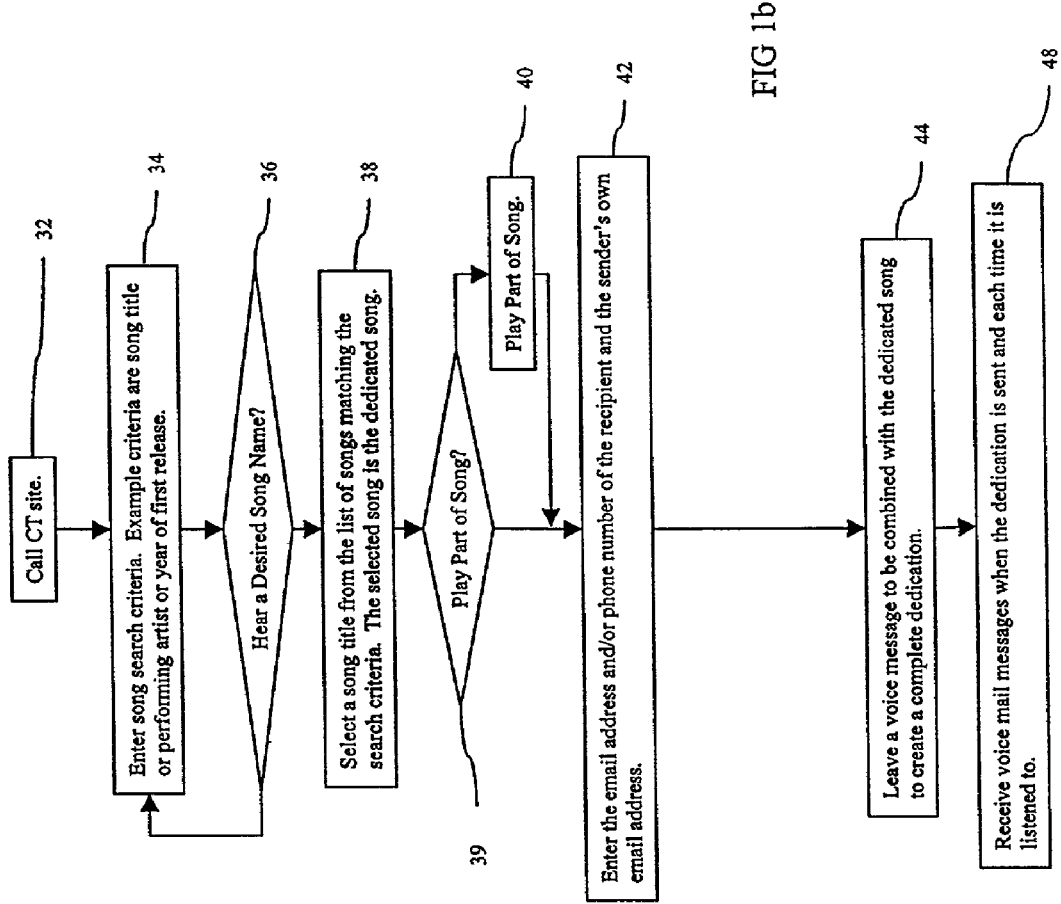
FIG. 1b is a process flow diagram of the steps a sender takes to send a song dedication using a telephone according to the present invention.

FIG. 1b illustrates the steps a dedication sender takes in making a song dedication through a telephone-based dedication provider according to a another embodiment of the present invention. The sender, using a telephone calls a Computer Telephony (CT) or Interactive Voice Response (IVR) dedication system 32. The sender enters a song search criteria 34 such as a song title, a performing artist's name, or the year a song was first released using the telephone's keypad. In response, the sender receives an audio list of songs matching the search criteria from the provider. If the sender doesn't hear the desired song 36, the sender enters a search criteria again until a desired song is returned in the received list. The sender selects one of the songs from the audio list to be the dedicated song using the telephone's keypad 38. Alternatively, the sender may also select 39 to listen to a portion of the dedicated song 40 to ensure the dedicated song is the one the sender wanted. The sender enters transaction information including the email address of the sender and the recipient and an optional recipient phone number 42. The sender leaves a voice message 44 to be combined with the dedicated song to create a dedication. Alternatively, a text message may be used as a dedication message. The sender receives a voice message 48 informing the sender that the dedication has been sent. The sender receives another voice message every time the recipient listens to the dedication.

Figure 1C:
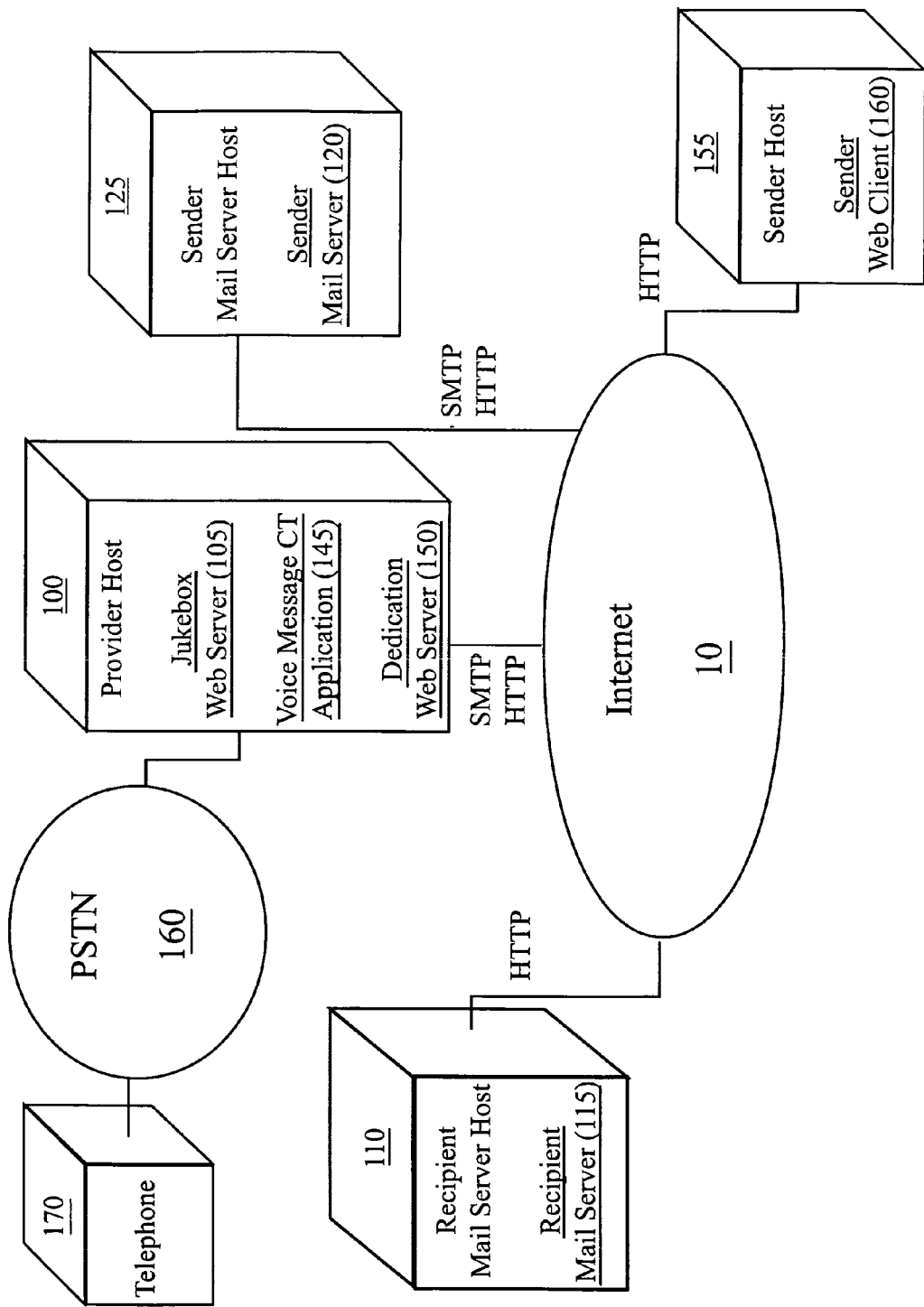
FIG. 1c is an exemplary deployment diagram illustrating how software objects are deployed in an exemplary Internet-based dedication system.

FIG. 1c illustrates schematically the software objects useful in making a song dedication through a Web-based dedication provider according to a preferred embodiment of the present invention. A sender host 155 hosts sender Web client 160 which may be a Web browser such as Internet Explorer. A sender mail server host 125 hosts a sender mail server 120. The sender mail server and the sender Web client can communicate with each other via the Internet 10 by the use of Hyper Text Transfer Protocol (HTTP) to exchange documents written in a document markup language such as Hyper Text Markup Language (HTML). Documents written in HTML are commonly termed "Web pages." The sender mail server can serve a document-based user interface for retrieval of mail messages by the sender Web client.

A recipient mail server host 110 is also provided which hosts a recipient mail server 115. Like the sender mail server, the recipient mail server can serve a document-based user interface for retrieval of mail messages by a recipient Web client. Through the use of the Internet, the recipient mail server and a recipient web client can also communicate with each other.

A provider host 100 hosts a jukebox Web server 105 that communicates via the Internet with the sender mail server and the recipient mail server 115, preferably using Simple Mail Transfer Protocol (SMTP) to send email messages. A computer telephony host 140 hosts a voice message computer telephony (CT) application 145 and a dedication Web server 150. The voice message CT application communicates through a Public Switch Telephone Network (PSTN) 160 with a sender telephone 170.

Figure 2:
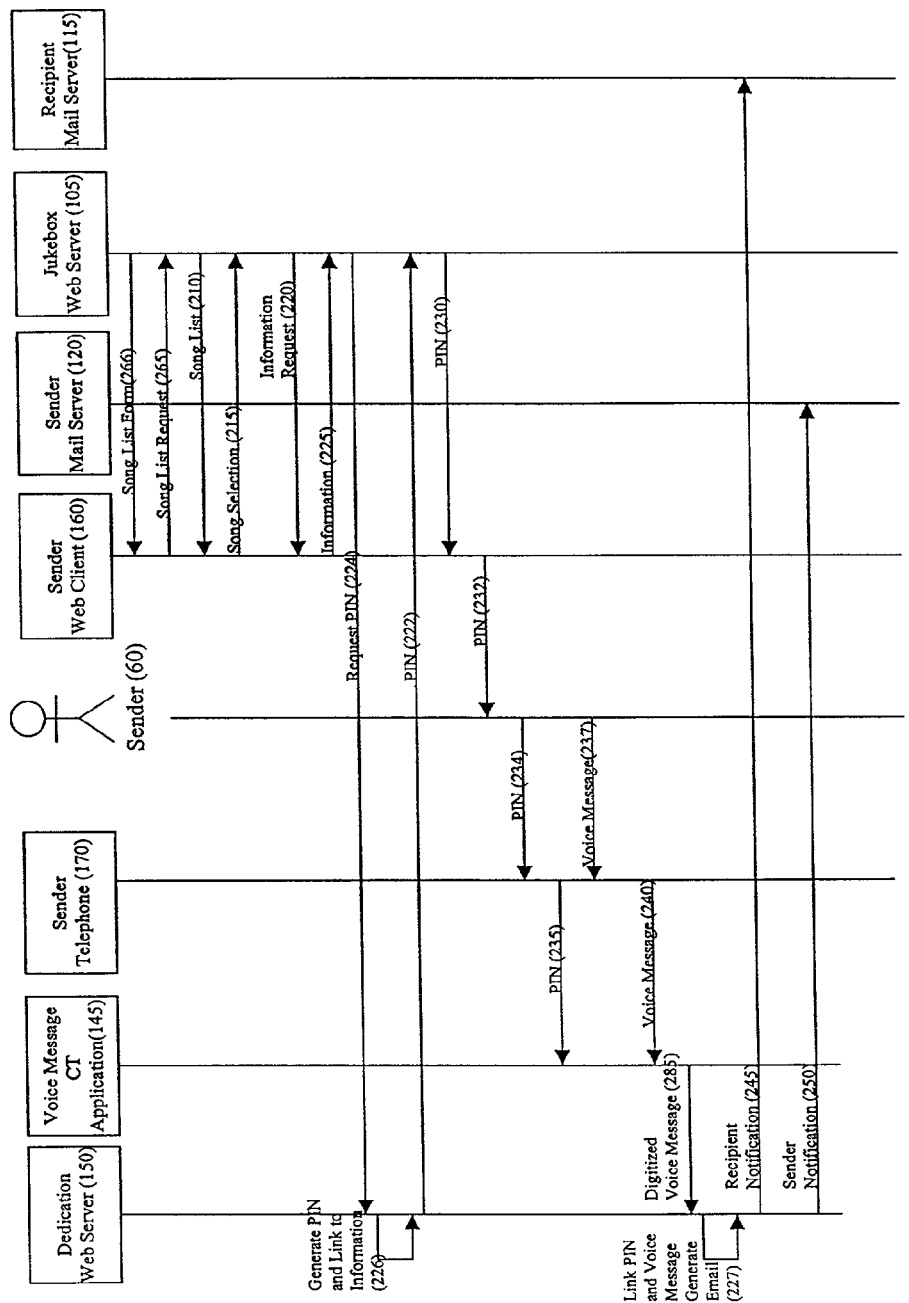
FIG. 2 is a sequence diagram of the process of creating an electronic song dedication.

FIG. 2 is a sequence diagram of how the software objects deployed in FIG. 1b communicate to allow a sender to create a song dedication. A sender 60 uses the sender web client to access the jukebox Web server. The jukebox Web server sends a song list form 266 to the sender Web client. The song list form is a Web page containing data fields for user input of song search criteria. The sender fills out the song list form and sends a song list request 265 to the jukebox Web server. The data fields from the song list form are used by the jukebox Web server to create a query for searching the jukebox Web server's available database of songs for songs matching the song list form data collected from the sender. The jukebox Web server then compiles a song list 210 and sends the song list to the sender Web client. The sender reviews the song list and selects a song to dedicate to a recipient. Alternatively, the sender may also listen to songs from the received list. The sender Web client sends the resulting song selection 215 to the jukebox Web server. The jukebox Web server, either along with the song list or separately, sends an information request form 220 to the sender Web client. The sender fills out the information form with relevant information such as the sender's email address, the recipient's email address or other delivery information such as a telephone number or a physical address, and any other relevant information such as billing information.

Once all relevant information 225 has been received, the jukebox Web server sends the sender's and the recipient's email addresses and a Uniform Resource Locator (URL) pointing to the dedicated song to the dedication Web server in the form of a request for a Personal Identification Number (PIN) 224. The dedication Web server generates a PIN, stores the sender and recipient information as well as the dedicated song URL for later use, links the PIN to the stored information and dedicated song URL and sends the PIN to the jukebox Web server.

The jukebox Web server sends the PIN along with instructions for recording a voice message to the sender Web client such as by email or in a PIN Web page 230. The sender Web client displays the PIN Web page to the sender who, by following the instructions, can use an audio device such as a telephone to access the voice message CT application and make a voice message. The PIN is used to make sure that the appropriate sender and voice message correspond to one another. In one embodiment, the sender uses a telephone to call the voice message CT application and then uses the PIN 234 to access the voice message CT application services to create a recorded voice message 240 in much the same way a conventional telephone answering machine is used to leave a voice message. Preferably, menus and other instructions are provided to assist the sender in creating the voice message.

The recorded voice message can be in either analog or digital format, but if an analog format is used, the recorded voice message should be converted to a digitized voice message 285. Once the voice message has been created, the voice message CT application sends the digitized voice message to the dedication Web server. In the preferred embodiment, the digitized voice message is in the same format as the song so that the song and the digitized voice dedication can be played by the same software application and hardware. The sender can then have the option of reviewing the voice message and modifying the voice message using the same steps set forth above in an iterative process. The dedication Web server stores the digitized voice message and associates the message location to the PIN 222 so that the message can be retrieved from its location using the PIN. An exemplary supplier of such technology for creating a digital voice message suitable for use in creating a dedication according to the present invention is Evoke Communications.

In an alternative embodiment, the voice message and the song are combined to create a single electronic data file suitable for replay by a digital audio system. This single electronic data file is sent to a recipient and the single electronic data file is retained by the recipient for replay.

In a further alternative embodiment, the voice message and the song are combined together to create a single entity. The combined voice message and song are then transferred to a permanent storage medium such as a compact disk or cassette tape. The permanent storage medium is then mailed to the recipient.

For the preferred embodiment the dedication Web server generates two email notifications 227 using the PIN, one to the recipient email address, and the other to the sender email address. The dedication Web server sends a first email recipient notification 245 to the recipient. The body of the recipient notification informs the recipient that a dedication has been made by the sender to the recipient. The dedication Web server sends a second email notification as a sender notification 250 to the sender. The body of the sender notification informs the sender that the dedication has been sent.

The recipient and sender email notifications contain the URL of a play dedication server script located on the dedication Web server. The play dedication server script can be the same for all dedications made using the jukebox server. The play dedication server script can be invoked by selecting its URL from the body of each email notification. The play dedication server script takes as a single argument the PIN used to store the voice message and dedicated song URL. The play dedication server script uses the PIN to determine the URL of the voice message served by the dedication Web server and the URL of the dedicated song served by the jukebox Web server. The play dedication server script executes and returns a Web page and a dedication client script. The Web page can be a standard Web page used for all of the dedications made through the jukebox server. The dedication client script contains the URLs of the voice message and dedicated song. The dedication client script is different for each song dedication made because it includes the URLs for the voice message and the dedicated song. This dedication client script constitutes the software embodiment of the complete dedication. The dedication client script may be executed by the recipient Web client to play the voice message and the dedicated song as a single dedication by the recipient's Web client. This completes the process of creating a dedication.

In an alternative embodiment, the dedication Web server, the voice message CT application, and the jukebox Web server may be hosted by separate hosts. This is advantageous because multiple voice message CT applications can be conveniently located in different geographic locations to minimize phone toll costs while allowing a single jukebox Web server to support multiple dedication Web servers.

In an alternative embodiment, the jukebox Web server is modified to include CT features allowing incoming calls and Interactive Voice Response (IVR) features. This allows the jukebox Web server to be accessed from a sender telephone. Those skilled in the art of telephony will recognize that the sender telephone can be a land line-basedd telephone, a wireless telephone, or any device capable of accessing the jukebox Web server via a telephone line. In this alternative embodiment, the sender is presented with a selection of songs, preferably a short selection that can be summarized in a voice message by the CT system. As one example, the sender can be presented with the current top ten popular songs. The sender selects a song from the list using the keys of the sender telephone's keypad to indicate the selection. The sender enters the previously described recipient delivery information via the sender telephone's keypad. The sender leaves a voice message and the jukebox web server forwards the voice message to the dedication Web server. In an alternative embodiment, lists of songs can be distributed with identification codes identifying specific songs. In this embodiment, upon studying the list of songs, the sender can enter the identification code for the selected song when prompted. Those skilled in the art of telephony will recognize that these two embodiments can be combined into a single embodiment. For example, the sender may have the option of selecting the ten most popular songs by selecting a single keypad digit or the sender may press a special keypad key such as "*" and then enter the identification number of a song from the previously described list. These alternative embodiments are useful when potential senders are solicited through print media such as printed merchandising catalogs or sales literature. In still another embodiment, a series of menus can be used. For example, the sender can be presented with a number of choices for different types of music such as top ten songs, popular romantic songs, classic rock and roll songs, country music songs, top 10 dedicated songs, or seasonal songs such as Christmas carols. Upon selecting a type of music, the sender is then presented with a list of specific songs in that category from which a selection may be made.

To better understand the aspects of the invention from the perspective of the sender, FIGS. 3–9 illustrate screen captures of an exemplary Web site implementing the dedication creation process as previously described. FIG. 3 is a home Web page of the exemplary provider Web site. The home Web page contains instructions 800 informing the sender of the steps necessary to make a dedication. By selecting the appropriate hyperlink 810, the sender is able to create and send a dedication.

FIG. 4 is an exemplary Web page of a data entry form used to request a song or group of songs from a song database. The sender can fill in information such as an artist's name or partial name in an artist field 300, a song title or partial song title in a song title field 305, or a year in a year field 310 which represents the year a particular song was first released. By selecting the "Submit" link 315, the entries are sent to the provider Web site.

Figure 5:
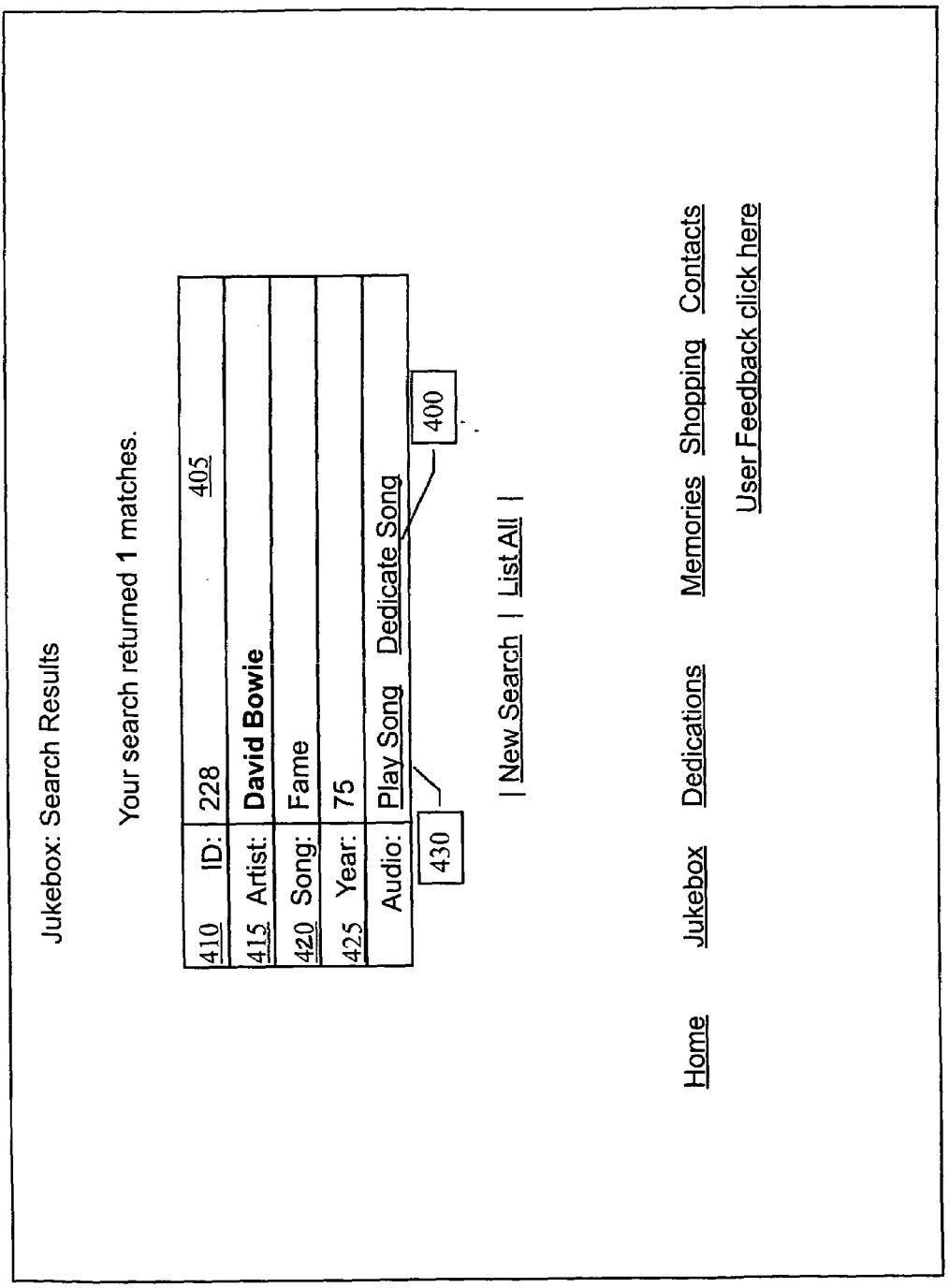
FIG. 5 is Web page showing the result of an exemplary song search.

FIG. 5 is an exemplary Web page showing the results of a song database query. A song's identification number ("ID") 410, the name of the performing artist 415, and first release year 425 are shown in box 405. Selecting a "Play Song" link 430 causes the exemplary Web site to send the song to the sender's web client so that the song can be played to the sender. The song is generally streamed to the sender's computer using any one of a number of software packages such as RealPlayer. The selection of a "Dedicate Song" link 400 requests the next exemplary Web page as shown in FIG. 6.

FIG. 6 is an exemplary Web page for a form used to collect the relevant information from the sender. For this embodiment, the information includes the email addresses of the sender and the recipient for use by the provider Web site. The sender's email address is entered in a "Sender's Email Address" field 500 and the recipient's email address is entered in a "Recipient's Email Address" field 505. The sender also enters a textual subject message in a "Subject" field 510. Selection of "Submit" 515 button sends the data entered into the fields to the provider Web site.

In another embodiment of a Web page for a form used to collect the relevant information from the sender, a phone number 511 of the recipient is requested for sending a song dedication to the recipient using a telephone.

In another embodiment of a song dedication system according to the present invention, the song dedication is sent to a plurality of recipients. In this case, the Web page for a form used to collect the relevant information from the sender allows the entry of a plurality of recipient names.

Figure 7:
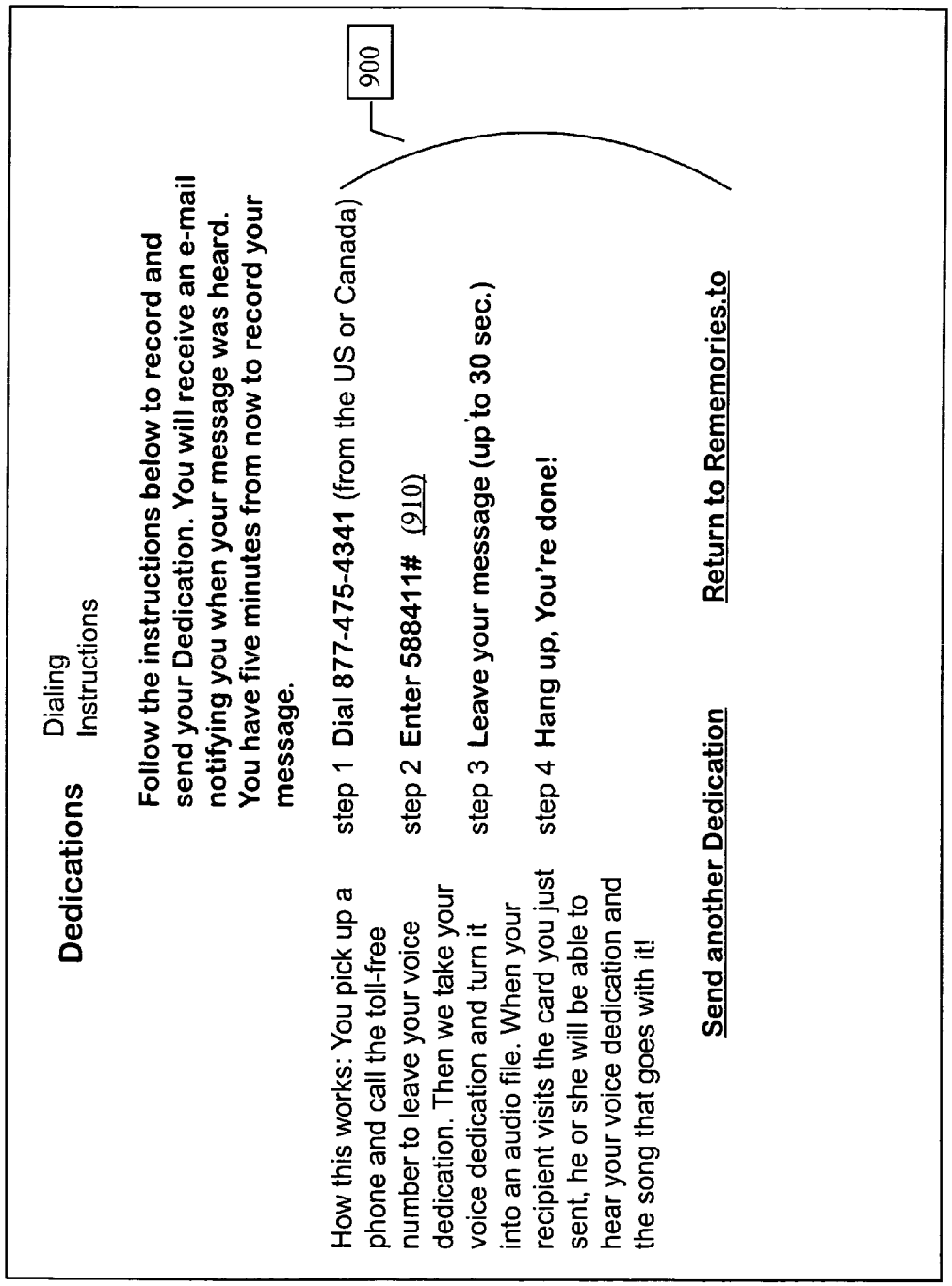
FIG. 7 is an exemplary Web page showing the steps to conclude the dedication according to the present invention.

FIG. 7 is an exemplary Web page illustrating the final steps in the dedication process. Instructions 900 are provided to instruct the sender to call a toll free number, enter the assigned PIN number 910, and record a voice message with the CT system. Preferably, the CT system uses menus and recorded instructions similar to those found on conventional voice message systems. Desirable options include the playback and editing of a voice message.

Figure 8:
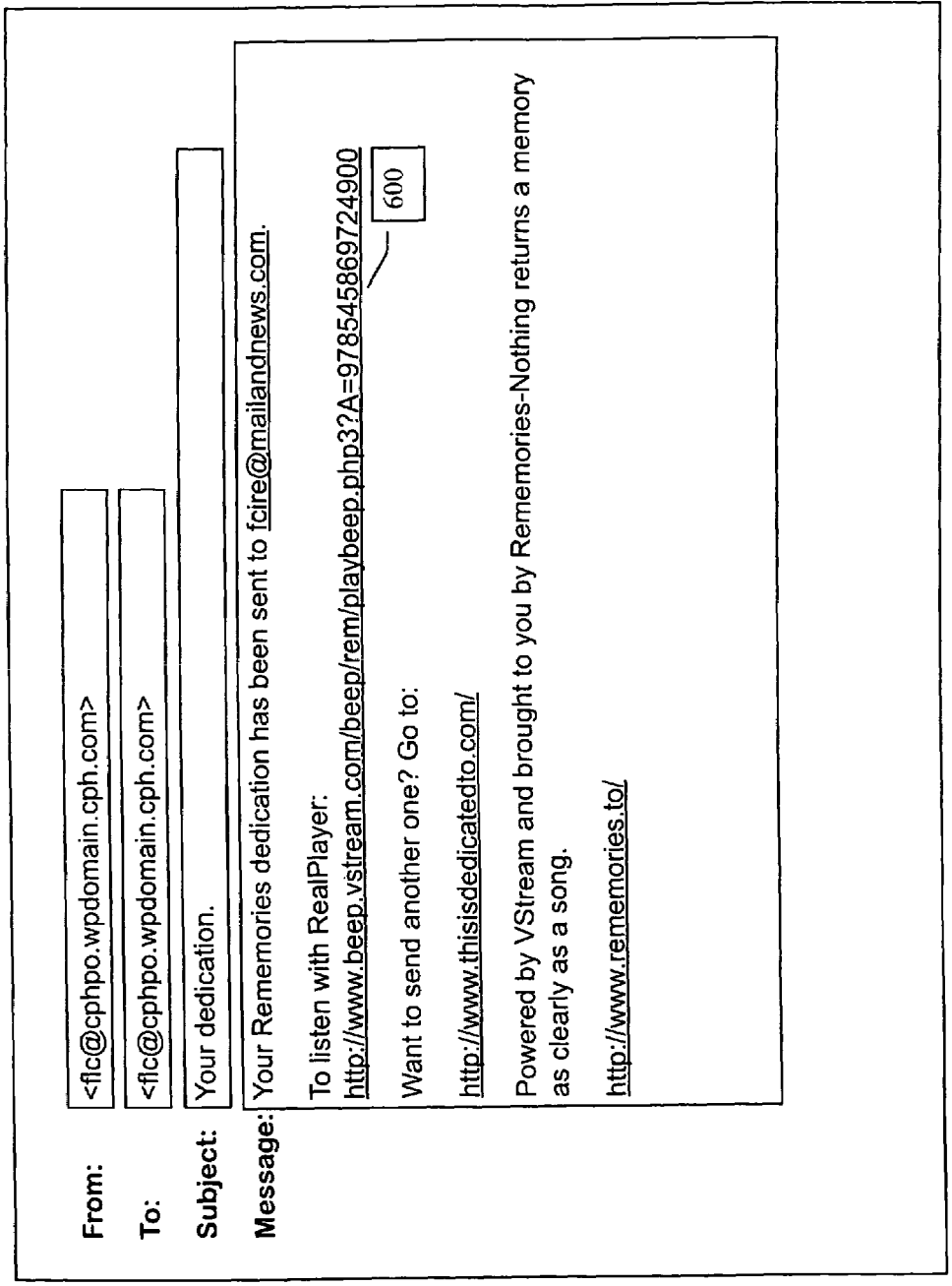
FIG. 8 is an exemplary email message confirming the sending of a dedication.

FIG. 8 is an exemplary email message sent to the sender from the exemplary Web site when the dedication process is completed. The sender can select hypertext link 600 to hear the dedication and song as they will be presented to the recipient on the exemplary Web site.

Figure 9A:
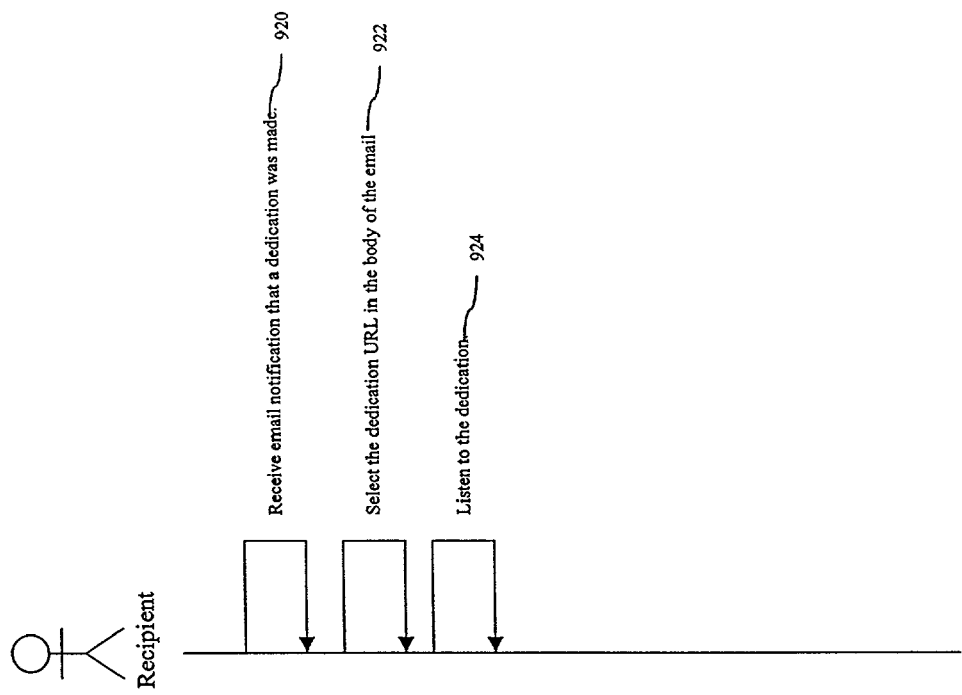
FIG. 9a is a sequence diagram of the steps a recipient takes to retrieve and listen to a song dedication according to the current invention.

FIG. 9a is a sequence diagram of the steps a recipient goes through in retrieving a dedication made by the sender to the recipient according to an exemplary embodiment of the present invention. The recipient receives an email recipient notification that a dedication has been made by the sender 920. The body of the recipient notification contains a URL. The recipient selects the URL 922 and the dedication is sent to and played for the recipient 924.

Figure 9B:
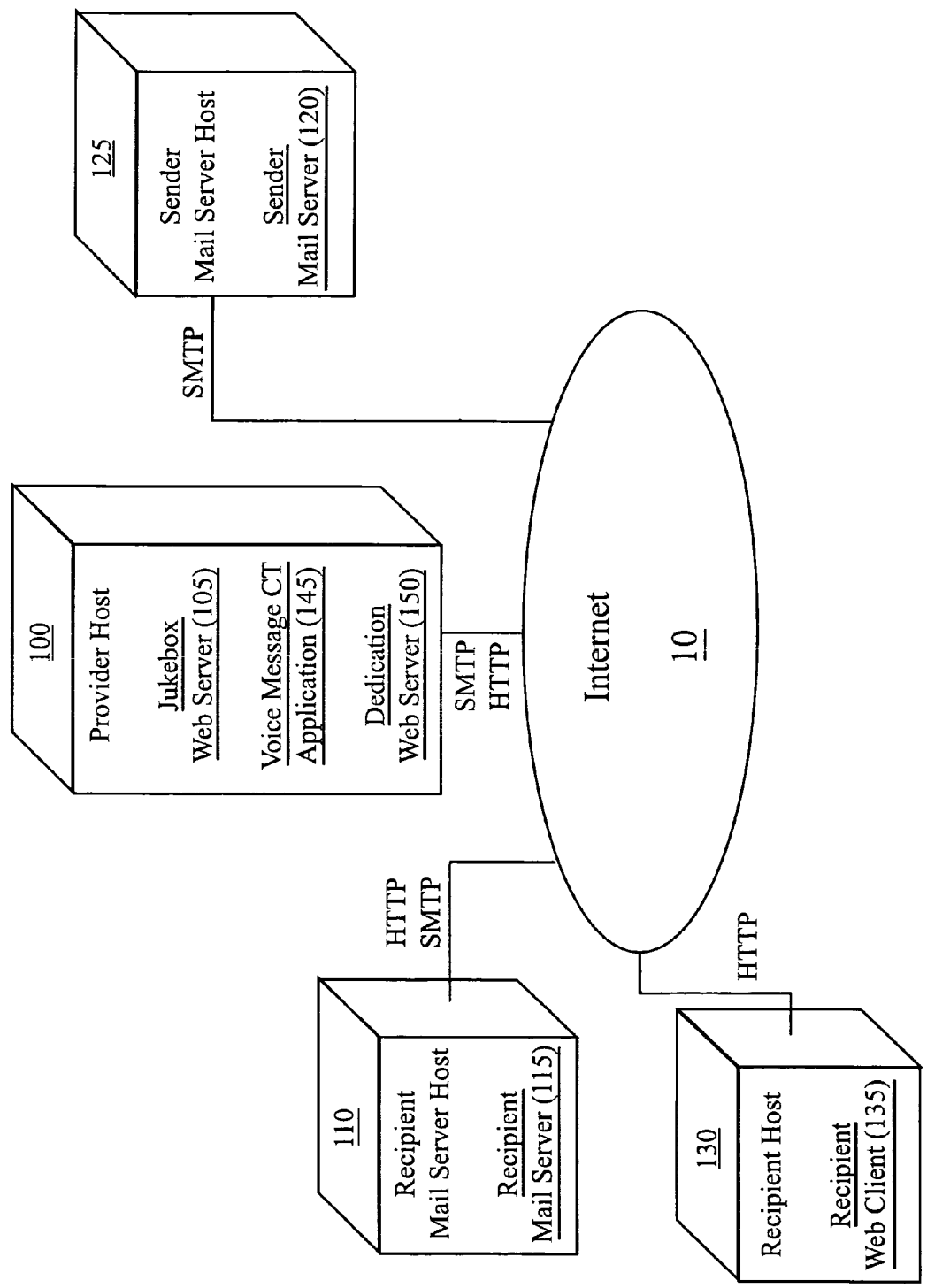
FIG. 9b is an exemplary deployment diagram illustrating how software objects are deployed in an exemplary Internet-based dedication retrieval system.

FIG. 9b is a deployment diagram showing an exemplary software object deployment illustrating how the dedication is sent to the recipient according to the present invention. The jukebox Web server communicates via the Internet using SMTP communication protocols to the sender mail server and the recipient mail server. The jukebox Web server and the dedication Web server communicate via the Internet to a recipient Web client 135 hosted by a recipient host 130 using HTTP communication protocols.

Figure 10:
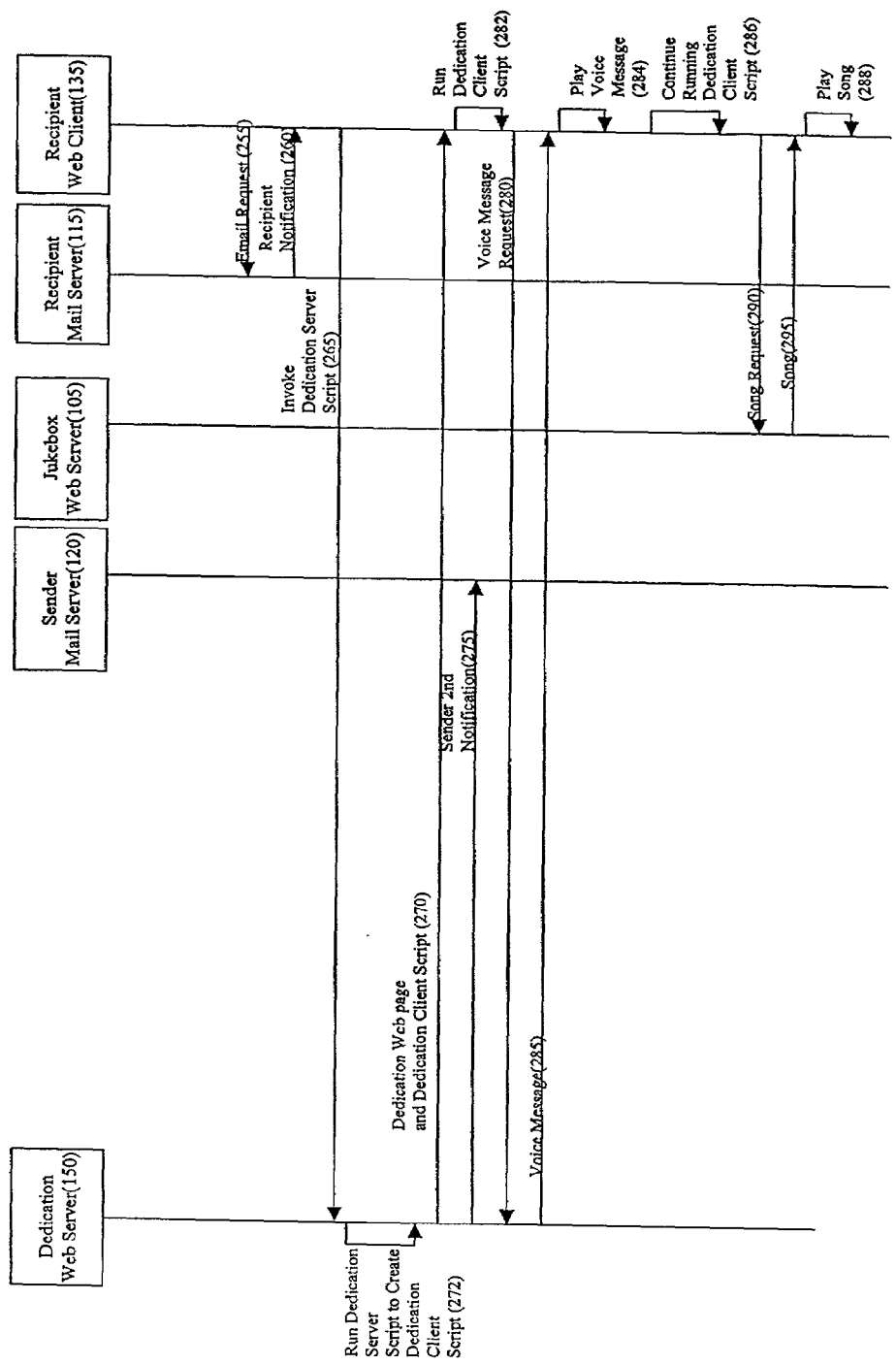
FIG. 10 is a sequence diagram of the process of retrieving a song dedication.

FIG. 10 is a sequence diagram of how the software objects in FIG. 9b communicate with each other to allow a recipient to retrieve a dedication. The recipient uses the recipient Web client to access the recipient mail server and sends an email request 255. The recipient mail server sends the previously described email recipient notification 260 to the recipient Web client. The recipient invokes 265 the previously described play dedication server script from the body of the recipient notification by selecting the URL of the play dedication server script. The play dedication server script creates 272 the previously described dedication client script and a dedication Web page 270 and sends the dedication client script and the dedication Web page to the recipient client. The recipient client displays the dedication Web page and executes the dedication client script 282. The recipient Web client retrieves the voice message 285 from the dedication Web server using the voice message URL located in the dedication client script. The Web client plays the voice message 284 for the recipient. The recipient Web client continues to execute 286 the dedication client script and retrieves 295 the dedicated song from the jukebox server using the URL of the dedicated song located in the dedication client script. The recipient Web client plays 288 the song for the recipient. This completes the dedication replay process.

Figure 11:
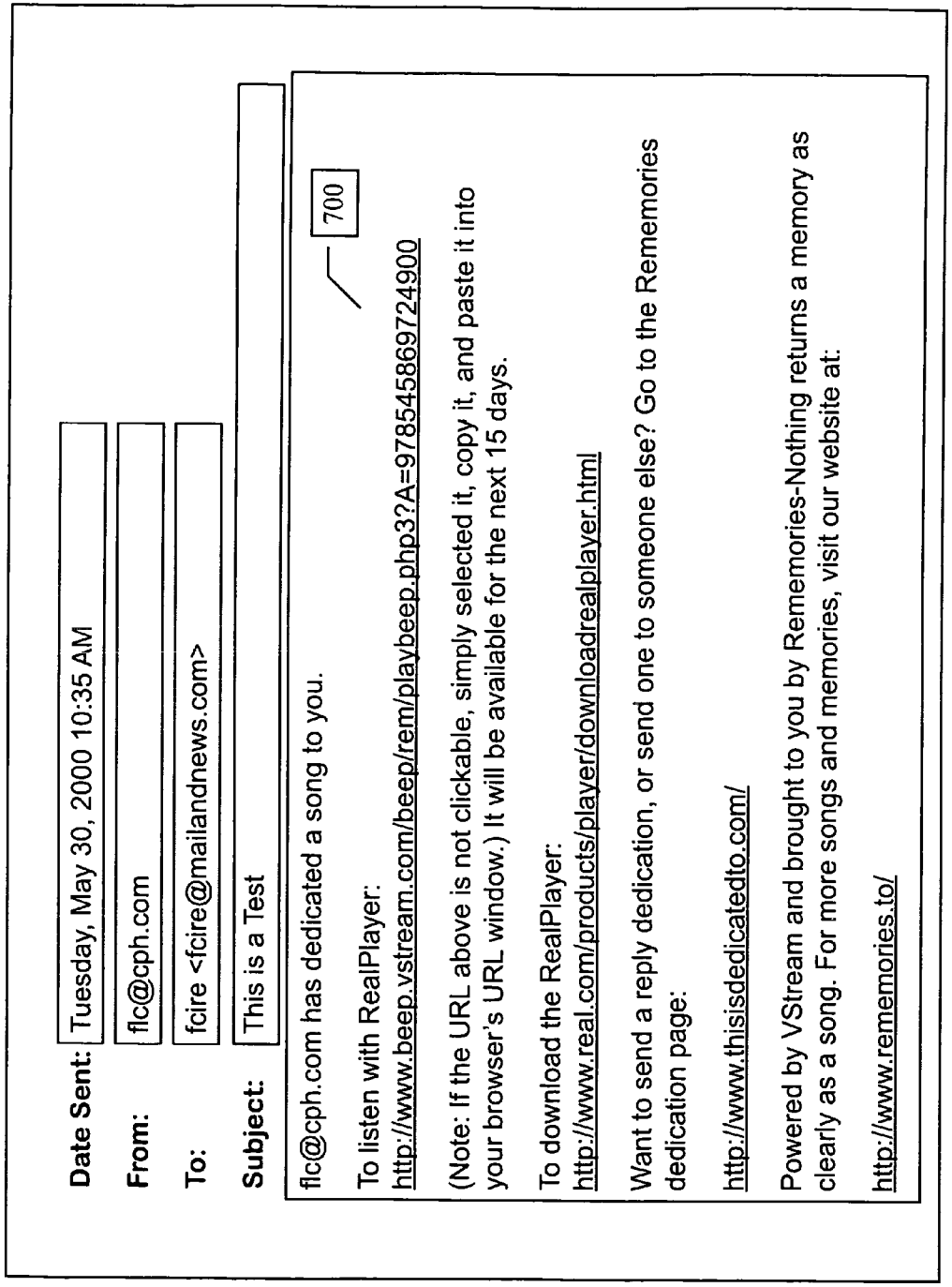
FIG. 11 is an exemplary email message informing a recipient that a dedication has been made.
Figure 13:
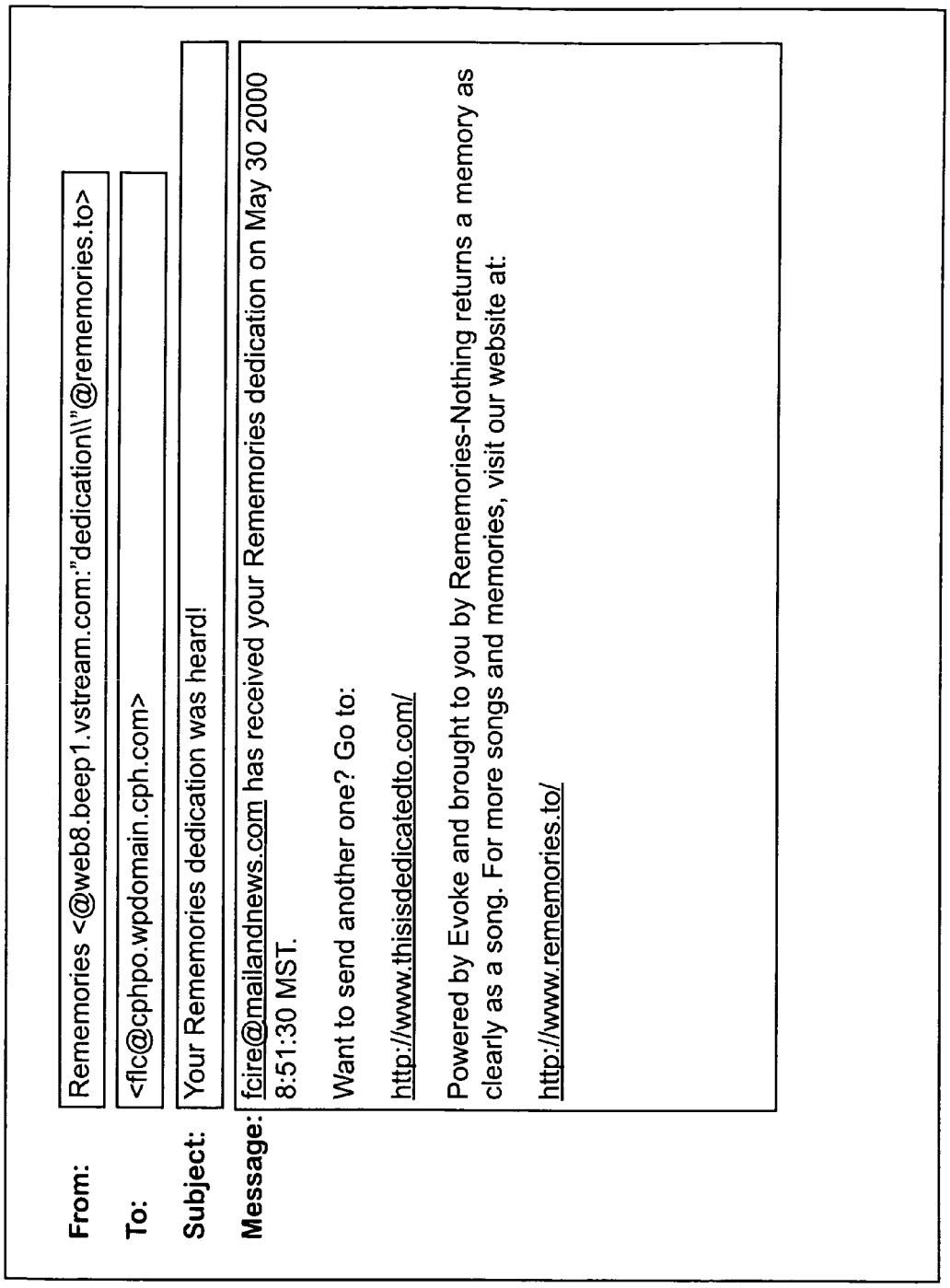
FIG. 13 is an exemplary email sent to a sender when a recipient retrieves a dedication.

FIGS. 11–13 illustrate exemplary Web pages and email messages sent to the recipient and the sender during the replay process. FIG. 11 illustrates an exemplary email message sent to the recipient. Selection of the URL hypertext link 700 invokes the recipient's Web client and invokes the previously described play dedication server script. This starts the replay process.

FIG. 12 is an exemplary Web page of the type sent by the provider Web site to the recipient. A previously described dedication client script file that accompanies the exemplary Web page of the type sent by the provider Web site contains two URLs, one for the digitized voice dedication and one for the actual song to be played after the digitized voice dedication. An exemplary dedication client script for the exemplary dedication contains:

--- rtsp://real4.beep.vstream.com/beep/2000/06/978545869724900.rm
rtsp://audioserver1.com/reunionmusic/David_Bowie_Fame_75.rm
—stop—
pnm://real4.beep.vstream.com/beep/2000/06/978545869724900.rm
pnm://audioserver1.com/reunionmusic/David_Bowie_Fame_75.rm

--- where:
rtsp://real4.beep.vstream.com/beep/2000/06/978545869724900.rm is the URL of the voice dedication
and:
rtsp://audioserver1.com/reunionmusic/David_Bowie_Fame_75.rm is the URL of the song to be played after the voice dedication.

FIG. 13 is an exemplary email message sent to the sender at the completion of the dedication playback to the recipient.

Figure 14:
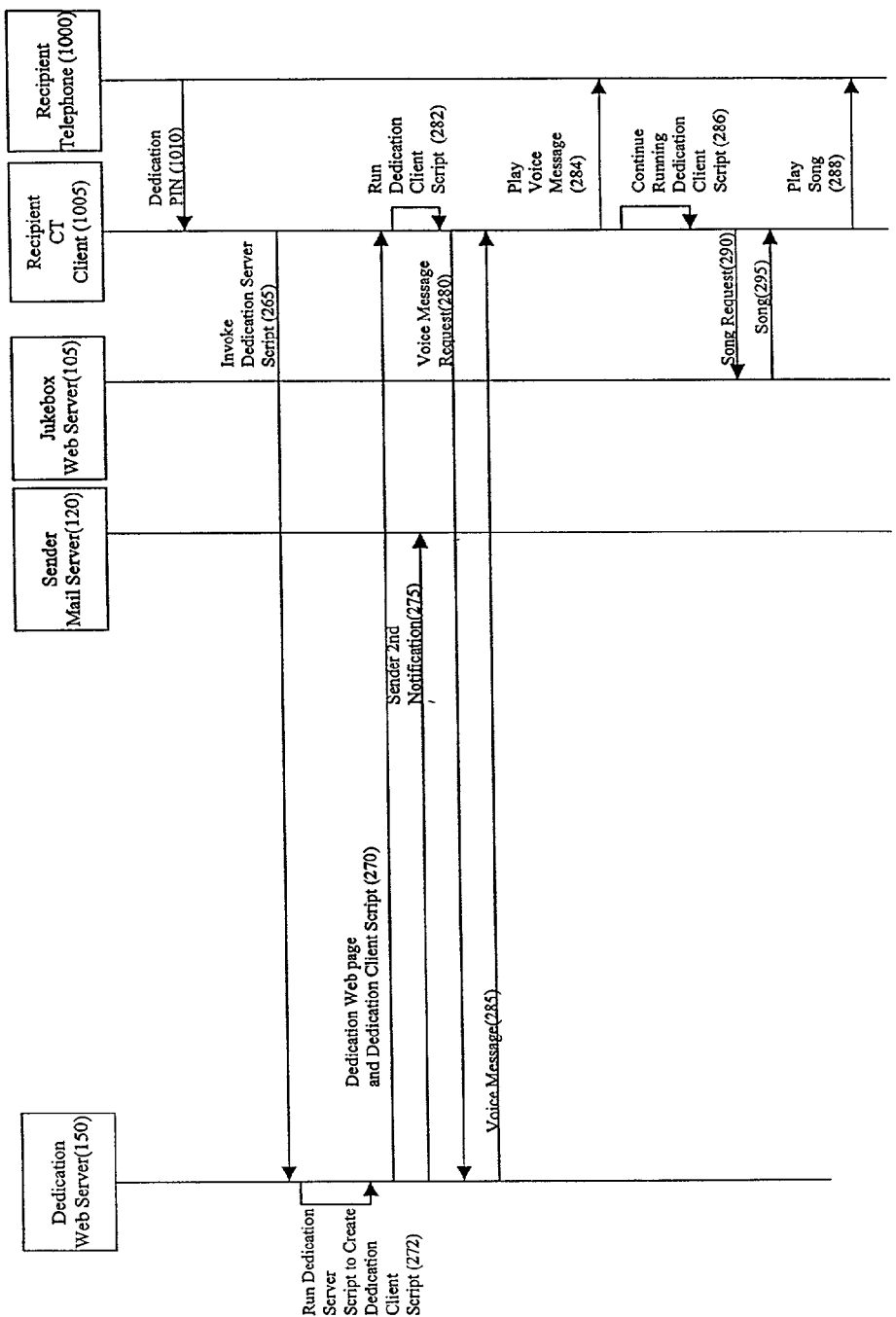
FIG. 14 is a sequence diagram of a phone-based dedication retrieval process.

FIG. 14 is an alternative telephone-based dedication retrieval process. This alternative retrieval process employs the same elements as the computer-based retrieval process previously described; however, a recipient uses a recipient telephone 1000 to contact a recipient CT client 1005 instead of using a recipient Web client to contact a dedication Web server. Those skilled in the art of telephony will recognize that recipient telephone 1000 can be either a land line-basedd telephone, a wireless telephone, or any device capable of accessing the recipient CT client via a telephone line. The recipient enters a dedication PIN 1010 using the keypad of the recipient telephone. The recipient CT client invokes the previously described play dedication server script 265 located on the previously described dedication Web server 150. The dedication Web server runs the play dedication server script 272 and creates the previously described dedication client script. The dedication Web server sends 270 the previously described dedication Web page and dedication client script to the recipient CT client. The dedication Web server sends a previously described second sender notification 275 to sender mail server 120. The recipient CT client runs 282 the dedication client script and sends a voice message request 280 to the dedication Web server. The dedication Web server sends 285 a voice message back to the recipient CT client and the recipient CT client plays the voice message over the recipient telephone to the recipient. The recipient CT client continues to run 286 the dedication client script and requests a song 290 from the jukebox Web server 105. The jukebox Web server sends the song 295 to the recipient CT client. The recipient CT client plays the song 288 over the recipient telephone to the recipient thus completing the dedication.

An exemplary use of the alternative telephone-based dedication retrieval process is to support the use of the electronic dedication as an electronic gift card. In one embodiment, useful when a retailer is accepting an order at a Web site, a text window is included in the check-out Web page sent by the retailer to conclude the purchase transaction. The text window is generated with a dynamically generated text message including previously described dedication PIN number and recipient CT client telephone number. In this exemplary use, the sender buys a gift for the recipient and the dedication PIN number and recipient CT client telephone number are placed in the gift's packaging, shipping slip, or decorative wrapping. The recipient unwraps the gift and obtains the dedication PIN and recipient CT client telephone number. The recipient uses the recipient CT client telephone number to call the recipient CT client and the recipient uses the recipient dedication PIN to obtain the dedication over the telephone. Another use for the telephone-based dedication retrieval process is to retrieve dedications when the recipient's email computer system is incapable of audio output. In this case, the phone number of the recipient CT client and the dedication PIN are included in the email message notifying the recipient that a dedication has been made. The email further includes instructions on how the recipient is to use the recipient CT client phone number and dedication PIN to retrieve a dedication over the phone.

An alternative embodiment of the invention provides for dedication Web server initiated contact with the recipient. Referring to FIG. 14, the recipient CT client 1005 is further modified to include call-out features. This allows the recipient CT client to request a recipient phone number from dedication Web server 150 and call the recipient phone number in order to deliver a dedication.

Figure 15:
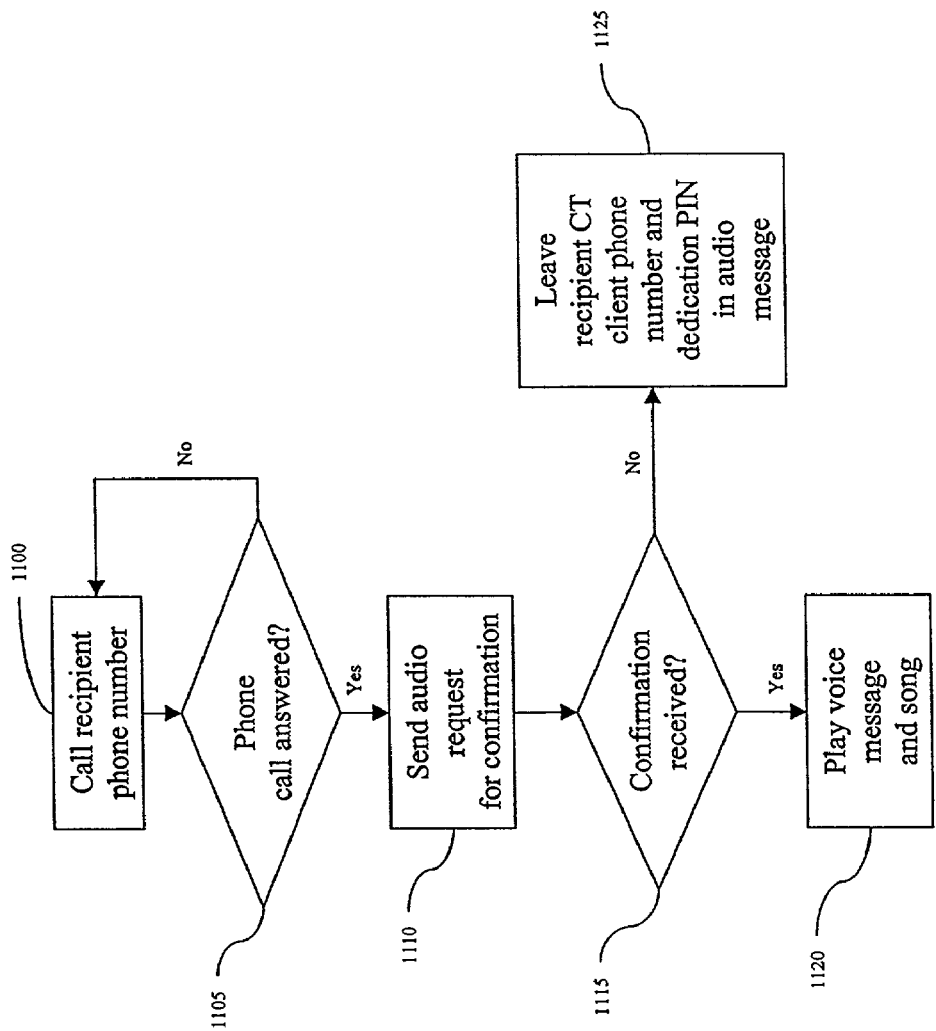
FIG. 15 is a flow chart of server initiated contact with a recipient for telephone-based dedication retrieval.

FIG. 15 is a flow chart of the control logic of how the recipient CT client can manage the phone call to avoid leaving the dedication on a phone message system. The recipient CT client calls the recipient phone number at step 1100. The recipient CT client checks to see if the phone call is answered. If the call is not answered, control returns to step 1100 and the recipient CT client tries the phone number again. If the telephone is answered, the recipient CT client sends an audio request for confirmation that a recipient has answered the telephone at step 1110. An exemplary request for confirmation is to ask the recipient to press a certain key on the keypad in response to the audio request for confirmation. If the requested key is not pressed, the recipient CT client assumes that the recipient CT client has contacted a voice mail system or answering machine and moves to step 1125. At step 1125 the recipient CT client creates an audio message requesting the recipient to call and retrieve the dedication sent to the recipient. The recipient CT client includes the recipient CT client's phone number and the previously described dedication PIN in the audio message. The recipient CT client's phone number and the dedication PIN can be used by the recipient to retrieve the dedication as illustrated in FIG. 14. If the confirmation key is pressed by a recipient after step 1115, the recipient CT client plays the voice message and the song completing the dedication.

In an alternative embodiment of the recipient CT client initiated dedication retrieval process, the recipient CT client 1005 of FIG. 14 confirms the dedication PIN 1010 is being sent from the same telephone phone number as the recipient phone number of step 1100 in FIG. 15. This ensures the dedication is played to the recipient intended by the sender.

In another embodiment of a song dedication system according to the present invention, song dedications are sent to a plurality of recipients. In this embodiment, a song dedication can be used as an invitation to a gathering, etc. Additionally, such an embodiment of the song dedication system can be used to send song dedications to promote a business enterprise as a form of advertising.

Figure 16:
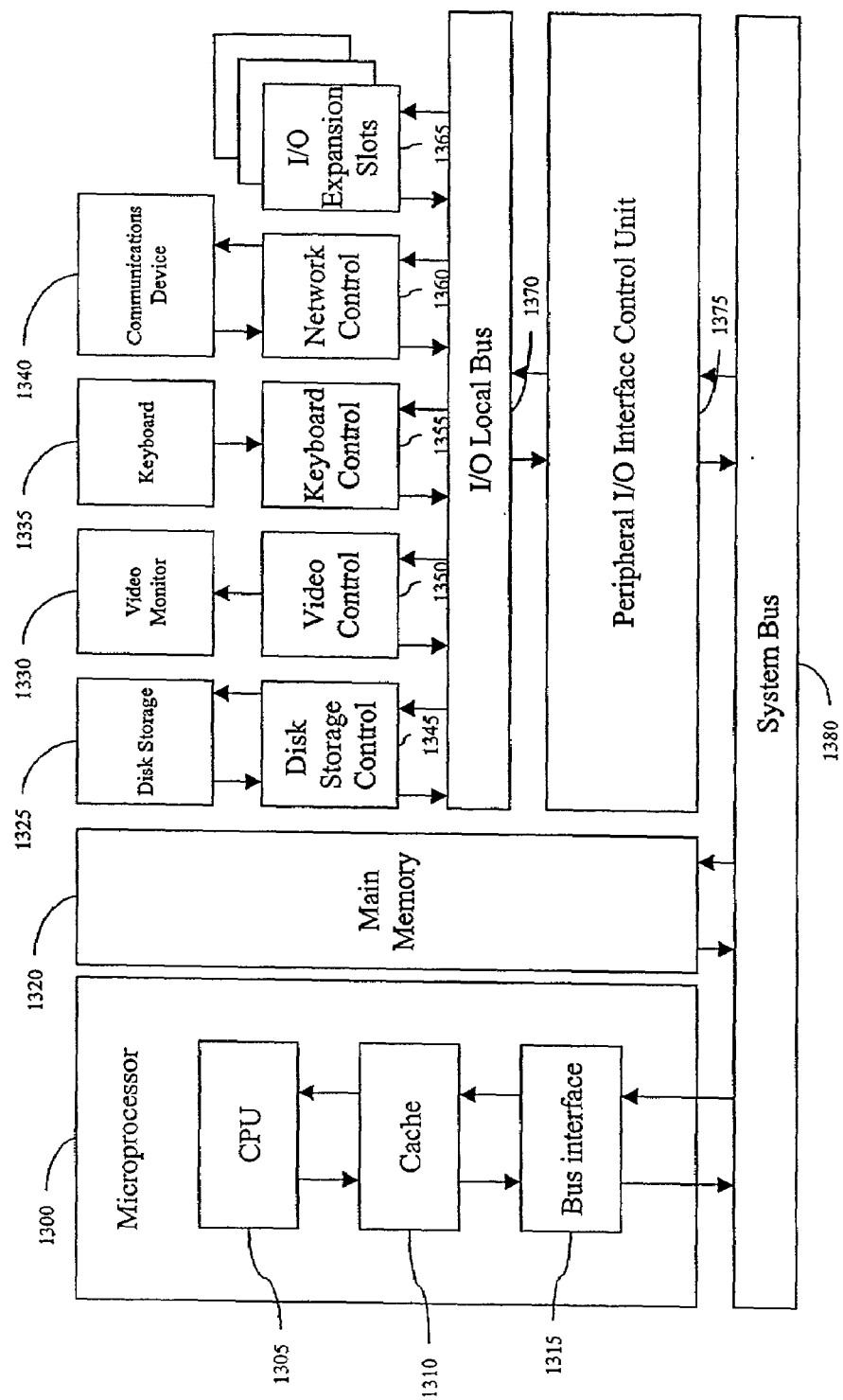
FIG. 16 is a computer architecture diagram of a general purpose computer suitable for use as an electronic song dedication server.

FIG. 16 is an architecture diagram for a general purpose computer suitable for use as a song dedication server according to the present invention. A microprocessor 1300, comprised of a Central Processing Unit (CPU) 1310, a memory cache 1320, and a bus interface 1330, is operably coupled a via system bus 1335 to a main memory 1340 and an I/O control unit 1345. The I/O interface control unit is operably coupled via an I/O local bus 1350 to a disk storage controller 1395, a video controller 1390, a keyboard controller 1385, a network controller 1380, and a I/O device controller 1375. The disk storage controller is operably coupled to a disk storage device 1355 for storage and retrieval of computer instructions 1397 and data. The video controller is operably coupled to an electronic display device 1360 for display of status information about the operation of the song dedication server. The keyboard controller is operably coupled to a keyboard 1365 for input of commands to the song dedication server. The network controller is operably coupled to a communications device 1396. The communications device is adapted to allow software objects hosted by the general purpose computer to communicate via a network with other software objects such as an World Wide Web browser. The I/O device controller is operably coupled to various input devices 1398 for input of operator instructions.

Computer program instructions 1397 implementing software objects included in a song dedication server are stored on the disk storage device until the microprocessor retrieves the computer program instructions and stores them in the main memory. The microprocessor then executes the computer program instructions stored in the main memory to instantiate a song dedication server according to the present invention.

Having described some of the preferred embodiments of the invention, a number of alternatives would be apparent to one of ordinary skill in the art. In one alternative embodiment of the invention, the step of recording a voice message is completed by using a microphone and digitizer sound card connected to the sender host hosting the sender Web client rather than using telephony technology. In another alternative embodiment of the invention, text-to-speech software hosted by the jukebox host is used to convert a text dedication into a voice dedication and this text-to-speech voice dedication is sent as the digitized voice dedication. In another alternative embodiment of the invention, the dedication and song are made available as a voice mail message retrievable using a telephone. In still another embodiment, the voice dedication and song are combined into a single audio file, preferably in digital format, that is sent in its entirety as an attachment to the email dedication notification sent to the recipient. The attachment format can be of any suitable format such as MP3. If such an audio file is electronically sent, it is preferred that the number of physical copies of the file that are made during the transfer be minimized. It is most preferable that all copies of the files other than the final copy received by the recipient be destroyed, except perhaps for archival purposes. In still another alternative embodiment, the voice dedication and song are combined into a single audio file that is encoded on to a digital or analog storage medium such as a DVD, CD, or tape that is physically sent to the recipient. In another alternative embodiment, a dedication Web server, a jukebox Web server, and a dedication CT application may be hosted by the same host. In another alternative embodiment, a music video may be dedicated by the sender instead of a song. For such an embodiment, either an audio message or an audiovisual message may be appended to the music video.

What is claimed is:

1. A method of sending a song dedication from a sender to a recipient, comprising:
   receiving transaction information from the sender, the transaction information comprising a recipient address, a song selection, and a voice dedication message;
   generating a personal identification number corresponding to the transaction information;
   transmitting the personal identification number to the recipient at the recipient address;
   receiving a request from the recipient, the request including the personal identification number; and
   transmitting the voice dedication message and a song selected based on the song selection to the recipient at the recipient address,
   wherein the recipient is capable of listening to the voice dedication message separately from the song.

2. The method of claim 1 wherein the transmitting of the voice dedication message and the song to the recipient is performed using the Internet.

3. The method of claim 1 wherein the transmitting of the voice dedication message and the song to the recipient is performed telephonically.

4. The method of claim 1 wherein the transaction information further comprises a sender address, the method further comprising transmitting a confirmation to the sender at the sender address after the recipient has been sent the voice dedication message and the song.

5. The method of claim 1 further comprising receiving from the sender a telephone message for use as the voice dedication message.

6. The method of claim 1, wherein the song is transmitted to only the recipient identified via the recipient address in the received transaction information from the sender.

7. The method of claim 1, wherein the song and the voice dedication are not mixed.

8. The method of claim 1, wherein the voice dedication message is separately retrievable from the song.

9. A method of transmitting a song dedication from a sender to a recipient, the song dedication comprising a voice dedication message and a song, the method comprising:
   transmitting a song selection list to the sender;
   receiving transaction information from the sender, the transaction information comprising a recipient address, a song selected from the song selection list, and a sender address;
   generating first and second personal identification numbers corresponding to the transaction information;
   transmitting to the sender a telephone number and the first personal identification number;
   receiving the first personal identification number from the sender;
   receiving from the sender a telephone message for use as the voice dedication message;
   transmitting the second personal identification number to the recipient at the recipient address;
   receiving a request from the recipient, the request including the second personal identification number; and
   sending the song dedication to the recipient at the recipient address.

10. The method of claim 9 wherein the sending the song dedication to the recipient is performed using the Internet.

11. The method of claim 9 wherein the sending the song dedication to the recipient is performed telephonically.

12. The method of claim 9 wherein a recording of the song is embodied in a permanent storage medium and delivered to the recipient.

13. A data processing system adapted to send a song dedication from a sender to a recipient, comprising:
   a processor; and
   a memory operably coupled to the processor and having program instructions stored therein, the processor being operable to execute the program instructions, the program instructions including:
      receiving from the sender, recipient address information;
      generating an identification number;
      associating a song and a voice message using the identification number;
      sending the identification number to the recipient using the recipient address information;
      receiving a request from the recipient, the request including the identification number;
      generating a document using the identification number, the document including:
         song retrieval instructions; and
         voice message retrieval instructions; and
      sending the document in response to the request.

14. The data processing system of claim 13, the program instructions further including:
   receiving sender address information;
   sending a notification to the sender using the sender address information.

15. The data processing system of claim 13, the program instructions further including receiving the voice message from the sender.

16. The data processing system of claim 13, the program instructions further including:
   sending a song selection list to the sender, the list including at least one song;
   receiving a song selection from the sender, the song selection taken from the song selection list; and
   using the song selection to indicate the song linked by the identification number to the voice message.

17. The data processing system of claim 16, the program instructions further including:
   receiving song selection criteria from the sender; and
   generating the song selection list using the song selection criteria.

18. A data processing system adapted to send a song dedication from a sender to a recipient, comprising:
   a processor; and
   a memory operably coupled to the processor and having program instructions stored therein, the processor being operable to execute the program instructions, the program instructions including:
      receiving recipient address information from the sender;
      generating an identification number;
      associating a song and a voice message using the identification number;

sending the identification number to the recipient using the recipient address information;

receiving a request from the recipient, the request including the identification number;

retrieving the voice message using the identification number for retransmission to the recipient; and retrieving the song using the identification number for retransmission to the recipient.

19. The data processing system of claim 18, the program instructions further including:

receiving sender address information; and sending a notification to the sender using the sender address information.

20. The data processing system of claim 18, the program instructions further including receiving the message from the sender.

21. The data processing system of claim 18, the program instructions further including:

sending a song selection list to the sender, the list including at least one song;

receiving a song selection from the sender, the song selection taken from the song selection list; and using the song selection to indicate the song linked by the identification number to the message.

22. The data processing system of claim 21, the program instructions further including:

receiving song selection criteria from the sender; and generating the song selection list using the song selection criteria.

23. A data processing system adapted to send a song dedication from a sender to a recipient over the Internet, comprising:

a processor; and a memory operably coupled to the processor and having program instructions stored therein, the processor being operable to execute the program instructions, the program instructions including:

receiving from the sender, song selection criteria;

generating a song selection list from the song selection criteria, the song selection list including at least one song;

sending the song selection list to the sender;

receiving from the sender a song selection, the song selection selected from the song selection list;

receiving from the sender, recipient address information;

generating a personal identification number;

recording a voice message from the sender;

associating a song indicated by the song selection and the voice message using the personal identification number;

sending a recipient notification to the recipient using the recipient address information, the recipient notification including:

the personal identification number; and document request instructions;

receiving from the recipient a document request according to the document request instructions, the document request including the personal identification number;

generating a document using the identification number, the document including:

song retrieval instructions for retrieval of the song; and voice message retrieval instructions for retrieval of the voice message; and sending the document to the recipient as a response to the document request.

24. The data processing system of claim 23, the program instructions further including:

receiving a song request according to the song retrieval instructions; and sending the song in response to the song request.

25. The data processing system of claim 23, the program instructions further including:

receiving a voice message request according to the voice message retrieval instructions; and sending the voice message in response to the voice message request.

26. A method of transmitting a song dedication from a sender to a recipient via a computer network and a telephone network, the method comprising:

providing a dedication server operably coupled to the telephone network and operably coupled to the computer network;

providing a jukebox server operably coupled to the computer network;

transmitting a song selection list to the sender from the jukebox server via the computer network;

receiving transaction information by the jukebox server from the sender via the computer network, the transaction information comprising a recipient email address, and a song selected from the song selection list;

generating by the jukebox server first and second personal identification numbers corresponding to the transaction information;

transmitting to the sender by the jukebox server via the computer network a telephone number for accessing the dedication server via the telephone network and the first personal identification number;

receiving by the dedication server from the sender via the telephone network the first personal identification number and a voice dedication message;

transmitting by the dedication server to the recipient via the computer network using the recipient email address the second personal identification number;

receiving by the dedication server from the recipient via the computer network a request, the request including the second personal identification number;

sending by the dedication server to the recipient via the computer network the song dedication.

* * * * *

UNITED STATES PATENT AND TRADEMARK OFFICE
CERTIFICATE OF CORRECTION

PATENT NO.        : 7,082,469 B2  
APPLICATION NO.   : 09/877817  
DATED             : July 25, 2006  
INVENTOR(S)       : Gold et al.

Page 1 of 1

It is certified that error appears in the above-identified patent and that said Letters Patent is hereby corrected as shown below:

In the Claims

Column 13, line 45, Claim 6          Delete "method,",  
                                     Insert --method--

Signed and Sealed this

Thirtieth Day of January, 2007

JON W. DUDAS  
*Director of the United States Patent and Trademark Office*